(12) United States Patent
Kobayashi

(10) Patent No.: US 7,593,223 B2
(45) Date of Patent: Sep. 22, 2009

(54) INFORMATION-PROCESSING APPARATUS AND COOLING SYSTEM USED THEREIN

(75) Inventor: Norio Kobayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 188 days.

(21) Appl. No.: 11/460,690

(22) Filed: Jul. 28, 2006

(65) Prior Publication Data

US 2007/0035925 A1    Feb. 15, 2007

(30) Foreign Application Priority Data

Aug. 9, 2005    (JP)    ............................ P2005-231126

(51) Int. Cl.
*H05K 7/20*    (2006.01)
(52) U.S. Cl. ................. 361/679.5; 361/695; 312/223.2; 454/184
(58) Field of Classification Search ......... 361/687–695, 361/379.49, 679.5; 454/184; 312/223.1–223.2, 312/236; 62/229; 415/213.1
See application file for complete search history.

(56) References Cited

U.S. PATENT DOCUMENTS

| | | | | |
|---|---|---|---|---|
| 5,751,549 | A  * | 5/1998 | Eberhardt et al. | ........... 361/687 |
| 6,104,608 | A  * | 8/2000 | Casinelli et al. | ............. 361/692 |
| 6,115,250 | A  * | 9/2000 | Schmitt | ...................... 361/695 |
| 6,288,897 | B1 * | 9/2001 | Fritschle et al. | ............. 361/687 |
| 6,414,845 | B2 * | 7/2002 | Bonet | .......................... 361/695 |
| 6,504,717 | B1 * | 1/2003 | Heard | ......................... 361/695 |
| 6,542,362 | B2 * | 4/2003 | Lajara et al. | ................. 361/687 |
| 6,889,752 | B2 * | 5/2005 | Stoller | .......................... 165/47 |
| 7,154,748 | B2 * | 12/2006 | Yamada | ....................... 361/690 |
| 7,230,827 | B2 * | 6/2007 | Sun et al. | ..................... 361/695 |
| 7,245,486 | B2 * | 7/2007 | Kumano et al. | ............. 361/687 |
| 7,259,961 | B2 * | 8/2007 | Lucero et al. | ............... 361/695 |
| 7,324,338 | B1 * | 1/2008 | Chi et al. | ..................... 361/695 |
| 2002/0067595 | A1 * | 6/2002 | Ogawa | ........................ 361/687 |
| 2005/0259392 | A1 * | 11/2005 | Vinson et al. | ............... 361/687 |
| 2005/0259393 | A1 * | 11/2005 | Vinson et al. | ............... 361/690 |
| 2007/0133168 | A1 * | 6/2007 | Shabany | ...................... 361/695 |
| 2007/0206353 | A1 * | 9/2007 | Boone et al. | ................. 361/694 |
| 2007/0211428 | A1 * | 9/2007 | Doll | ............................ 361/695 |

FOREIGN PATENT DOCUMENTS

| | | |
|---|---|---|
| JP | 2001-042973 | 2/2001 |
| JP | 2002-169626 | 6/2002 |

* cited by examiner

*Primary Examiner*—Jayprakash N Gandhi
*Assistant Examiner*—Courtney Smith
(74) *Attorney, Agent, or Firm*—Sonnenschein Nath & Rosenthal LLP

(57) ABSTRACT

An information-processing apparatus has housing enclosing at least one electronic part and has at least one opening and a passage connecting the opening and allowing air to flow therein. The apparatus has an air intake member, which is arranged in the passage, having two air intake portions for separating the air flown in the passage through the opening into its first and second portions. The apparatus has a first exhausting device that exposes the electronic part to the first portion of the air separated in the air take member and exhausts the first portion of the air to outside and a second exhausting device that exposes the electronic part to the second portion of the air separated in the air take member and exhausts the second portion of the air to outside. At least one air intake portion of the air intake member is positioned facing the electronic part.

8 Claims, 7 Drawing Sheets

INFORMATION-PROCESSING APPARATUS AND COOLING SYSTEM USED THEREIN

CROSSREFERENCE TO RELATED APPLICATION

The present invention contains subject matter related to Japanese Patent Applications JP 2005-231126 filed in the Japanese Patent Office on Aug. 9, 2005, the entire contents of which being incorporated herein by reference.

BACKGROUND OF THE INVENTION

1. Field of the Invention

The present invention relates to an information-processing apparatus and a cooling system suitable for use in the information-processing apparatus. More particularly, it relates to a personal computer and a cooling system used therein.

2. Description of Related Art

A personal computer has recently improved its performance remarkably. Accompanied by such the improvement, a central processing unit (CPU) has particularly radiated a large amount of heat. Thus, the personal computer preferably has any cooling system for cooling it by radiating such a large amount of heat generated by CPU and the like rapidly outside housing that encloses the CPU, to keep its operation stable.

A high-performance computer, particularly, a desktop computer, which has a large amount of heat, has provided a heat sink, a heat pipe, a cooling fan or the like to force the CPU generating the largest amount of heat among the electronic parts in the computer to be directly cooled. In this case, to take outside air into an interior of the computer 10 to force the CPU to be cooled, a front panel of housing in the computer 10 has provided many openings 12 to take the outside air thereinto (see FIG. 1). The heat sink has connected the CPU through the heat pipe(s) and cools the CPU by exposing the heat sink to the outside air taken from these openings thereinto.

FIG. 2 is a cross-sectional view of a related computer 20 for showing an example of air intake. The computer 20 has an optical drive 22, a first cooling fan 24, a second cooling fan 26, a third cooling fan 28, hard disk drives 30a, 30b, and 30c, a power unit 32, a heat sink 34, a heat pipe 36, CPU 38, an air intake opening 40, a first vent 42, a second vent 44, and a chassis 46.

The chassis 46 divides an interior space of the computer 20 into upper and lower chambers 48, 50. In the upper chamber 48 above the chassis 46, the first cooling fan 24, the heat sink 34, the heat pipe 36, the CPU 38 are provided near the first vent 42. The first cooling fan 24 takes outside air from the air intake opening 40 into the interior space of the computer 20 and forces the air to circulate, thereby exposing the heat sink 34 to the air. This enables the outside air to which the heat sink 34 is exposed to absorb any heat from the heat sink 34. The first cooling fan 24 exhausts this heat-absorbed air through the first vent 42 toward outside.

In the upper chamber 48, the third cooling fan 28 and the hard disk drives 30a, 30b, and 30c are provided opposite to the CPU 38.

In the lower chamber 50 below the chassis 46, the optical drive 22 is provided near holes 52 of the chassis 46. In the lower chamber 50, the second cooling fan 26 and the power unit 32 are provided near the second vent 44.

The third cooling fan 28 takes outside air from the air intake opening 40 into the interior space of the computer 20 and forces the air to circulate, thereby exposing the hard disk drives 30a, 30b, and 30c to the air. This enables the outside air to which the hard disk drives 30a, 30b, and 30c are exposed to absorb any heat from the hard disk drives 30a, 30b, and 30c. The third cooling fan 28 then forces the heat-absorbed air to circulate through the holes 52, thereby exposing the optical drive 22 to the air. This enables the air to which the optical drive 22 is exposed to absorb any heat further from the optical drive 22.

The second cooling fan 26 forces such the further heat-absorbed air to circulate, thereby exposing the power unit 32 to the air. This enables the air to which the power unit 32 is exposed to absorb any heat from the power unit 32. The second cooling fan 26 then exhausts this heat-absorbed air through the second vent 44 toward outside.

This allows the outside air taken from the air intake opening 40 into an interior space of the computer 20 to cool any electronic parts in the computer 20.

Japanese Patent Application Publication No. 2001-42973 discloses a computer having such the cooling system. According to the cooling system used in this computer, a side ventilation fan is provided at a side of CPU to cool the CPU. The side ventilation fan creates a flat current of air and sends it to the CPU, thereby exposing the CPU into the air to cool the CPU. This allows the air to circulate smoothly inside the computer, thereby cooling the CPU efficiently.

SUMMARY OF THE INVENTION

However, since in such the cooling system used in the computer, the electronic parts such as CPU and hard disk drive radiating a large amount of heat are positioned away from the air intake opening of outside air, it is difficult to expose the electronic parts such as CPU and hard disk drive to the outside air efficiently. Further, in the cooling system disclosed by the above Japanese publication, since the side ventilation fan has a flat configuration to create a flat current of air, it is difficult to expose the CPU to thick current of air to cool it.

It is desirable to provide an information-processing apparatus and a cooling system suitable for use in the information-processing apparatus, in which the electronic parts can be efficiently cooled by means of, for example, exposing the electronic part to outside air to an extensive area thereof.

According to an embodiment of the present invention, there is provided an information-processing apparatus. The apparatus has housing enclosing at least one electronic part to be cooled and having at least one opening and a passage connecting the opening. The passage allows air to flow therein. The apparatus also has an air intake member having two air intake portions for separating the air flown in the passage through the opening into its first and second portions. The air intake member is arranged in the passage. The apparatus further has a first exhausting device that exposes the electronic part to the first portion of the air separated in the air take member and exhausts the first portion of the air to outside and a second exhausting device that exposes the electronic part to the second portion of the air separated in the air take member and exhausts the second portion of the air to outside. At least one air intake portion of the air intake member is positioned facing the electronic part.

In the embodiment of the information-processing apparatus, the air intake portion of the air intake member may be positioned adjacent to a predetermined surface to be cooled of the electronic part. Thus, it is possible to expose the electronic parts such as CPU and hard disk drive to the outside air to an extensive area thereof. Therefore, the electronic parts can be efficiently cooled.

This prevents the electronic parts used in the information-processing apparatus from raising a temperature thereof, so that the information-processing apparatus can avoid throughput thereof from dropping under a condition where raising a temperature therein.

According to another embodiment of the present invention, there is provided a cooling system for cooling electronic part, which is suitable for use in the information-processing apparatus. The cooling system has housing enclosing at least one electronic part to be cooled and having at least one opening and a passage connecting the opening. The passage allows air to flow therein. The cooling system also has an air intake member having two air intake portions for separating the air flown in the passage through the opening into its first and second portions. The air intake member is arranged in the passage. The cooling system a first exhausting device that exposes the electronic part to the first portion of the air separated in the air take member and exhausts the first portion of the air to outside, and a second exhausting device that exposes the electronic part to the second portion of the air separated in the air take member and exhausts the second portion of the air to outside. At least one air intake portion of the air intake member is positioned facing the electronic part.

In the embodiment of the cooling system, the air intake portion of the air intake member may be positioned adjacent to a predetermined surface to be cooled of the electronic part. Thus, it is possible to expose the electronic parts such as CPU and hard disk drive to the outside air to an extensive area thereof. Therefore, the electronic parts can be efficiently cooled.

This prevents the electronic parts from raising a temperature thereof, so that the information-processing apparatus such as a personal computer having such the cooling system for the electronic parts can avoid throughput thereof from dropping under a condition where raising a temperature in the electronic parts.

The concluding portion of this specification particularly points out and directly claims the subject matter of the present invention. However, those skilled in the art will best understand both the organization and method of operation of the invention, together with further advantages and objects thereof, by reading the remaining portions of the specification in view of the accompanying drawing(s) wherein like reference characters refer to like elements.

DESCRIPTION OF THE PREFERRED EMBODIMENTS

The following will describe an information-processing apparatus and a cooling system use therein according to preferred embodiments of the present invention with reference to drawings.

Figure 1:
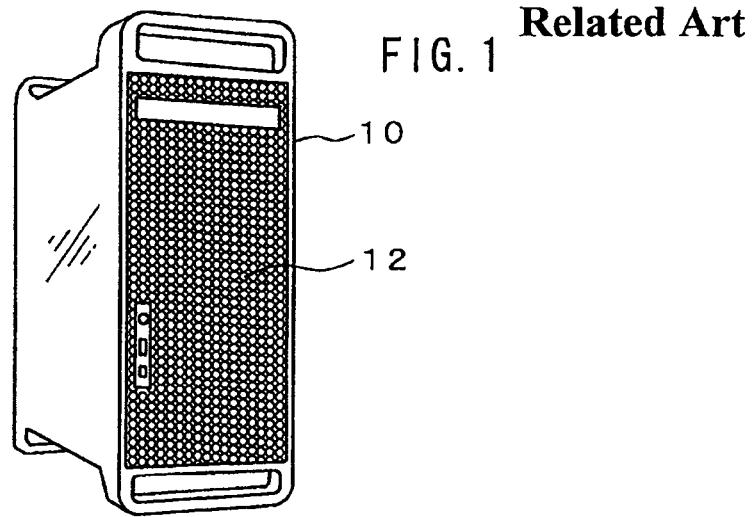
FIG. 1 is a diagram for illustrating a personal computer according to related art, a front panel of which has many openings.
Figure 2:
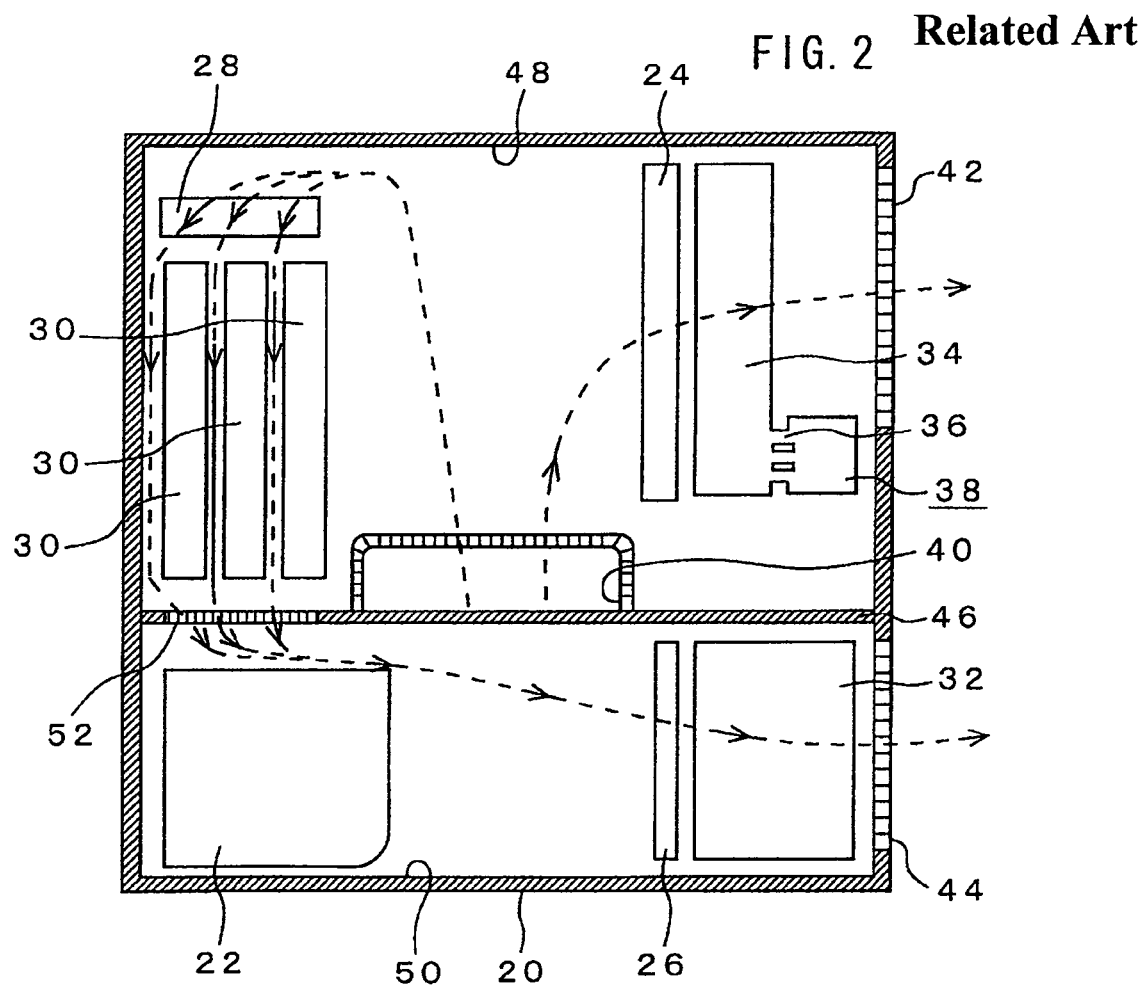
FIG. 2 is a cross-sectional view of a personal computer according to related art for showing an example of air intake.
Figure 3:
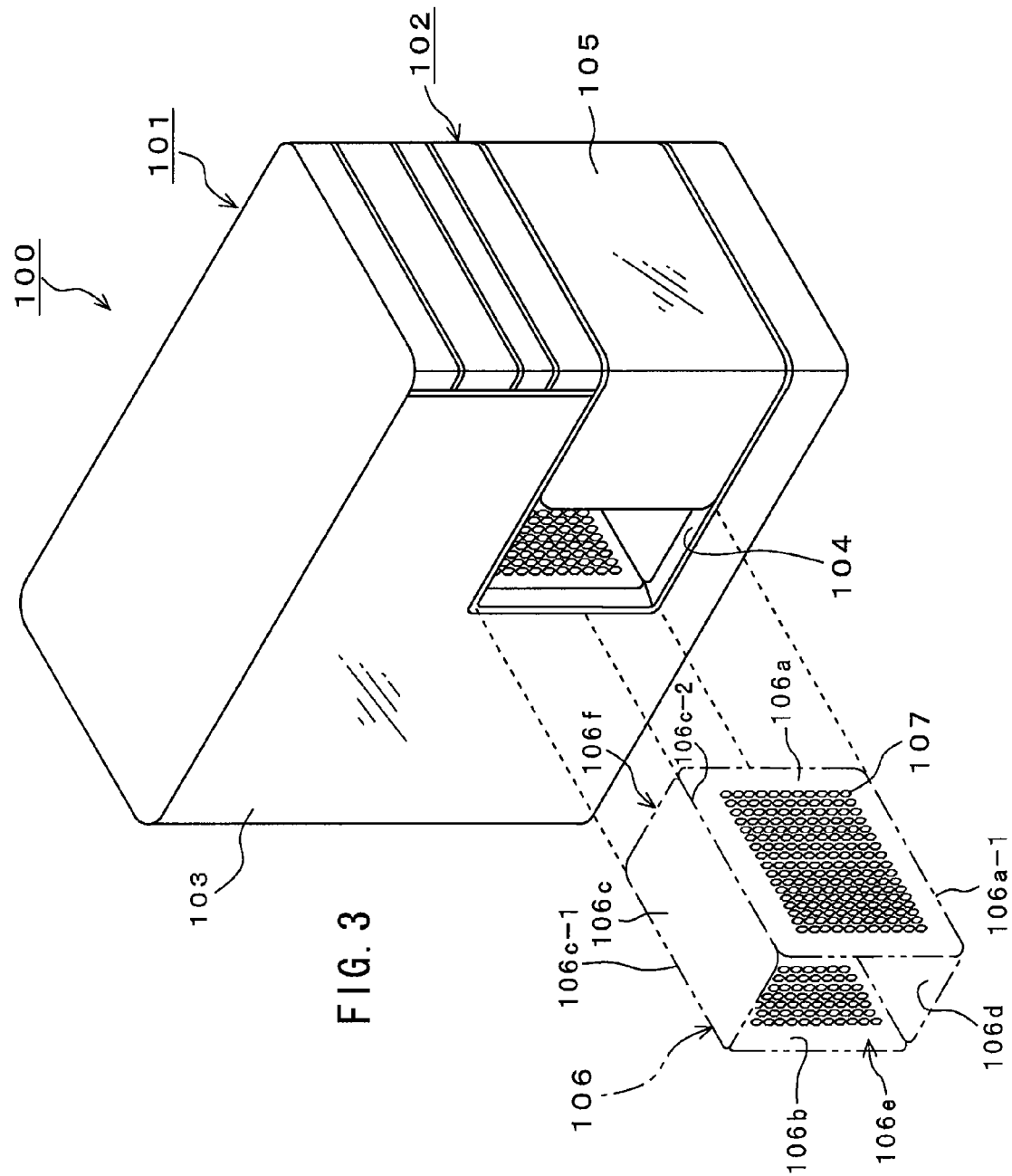
FIG. 3 is an illustration for showing a configuration of a personal computer as an information-processing apparatus according to an embodiment of the invention.

FIG. 3 shows an outline of a configuration of a personal computer 100 as the information-processing apparatus according to an embodiment of the present invention. The computer 100 has a cooling system for electronic parts used therein. Such the cooling system takes outside air from air intake, exposes the electronic parts into the air, and then exhausts the air to outside.

The computer 100 has a housing 101 that is composed of a front panel 102, side panels 103 having air intake openings 104, a rear panel 108, and top and bottom panels that are not shown. The front panel 102 includes a detachable member 105. For example, when a hard disk drive is installed into the computer 100, this member 105 is detached from the front panel 102 to install the hard disk drive into its install position of the computer 100, and then the member 105 is again attached.

The housing 101 encloses electronic parts such as CPU and the hard disk drive. The housing 101 has a passage, which is connecting both of the air intake openings 104 included in the side panels 103, for allowing air to flow therein. An air intake member 106 having two air intake portions 106a, 106b for separating the air flown in the passage into its two portions is arranged in the passage. In FIG. 3, the air intake member 106 is shown by a chain double-dot line with it being removed from the housing 101 sideways to outside. The air intake member 106 has a main body made of metal in which plural openings 107 are worn.

This air intake member 106 is made so that in a rectangular metal plate, first and second air intake portions 106a, 106b, a top portion 106c, and a bottom portion 106d can be laid out; many hexagonal openings 107 can be worn in the first and second air intake portions 106a, 106b, respectively; the first and second air intake portions 106a, 106b are respectively bent along lateral portions 106c-1, 106c-2 of the top portion 106c to form sides of the air intake member 106; the bottom portion 106d is bent along a lateral portion 106a-1 of the second air intake portion 106a to attach the first air intake portion 106b. This allows the air intake member 106 having a frame-like cross section to be formed.

It is to be noted that the top portion 106c and the bottom portion 106d have no opening. Opposite openings 106e, 106f of this air intake member 106 functions as air intake openings when the air intake member 106 is arranged in the passage.

The following describe how to install this air intake member 106 into the housing 101 through the air intake opening 104. The air intake member 106 is so set as to face the first and second air intake portions 106a, 106b toward a direction (hereinafter referred to as "air intake direction") perpendicular to a direction (hereinafter referred to as "passage direction") along the passage. The air intake member 106 is then inserted into the housing 101 through the air intake opening 104. In the housing 101, a hook provided therein hooks and holds the air intake member 106. Thus, when the first and second air intake portions 106a, 106b are arranged to face them toward the air intake direction perpendicular to the passage direction, the first air intake portion 106b of the air intake member 106 can be positioned facing side surfaces of the hard disk drives.

The air intake member 106 can be formed of two metal plates each having many openings 107 without having a top portion and a bottom portion. In this case, the two plates are secured to install places in the housing 101 by screws.

Figure 4A:
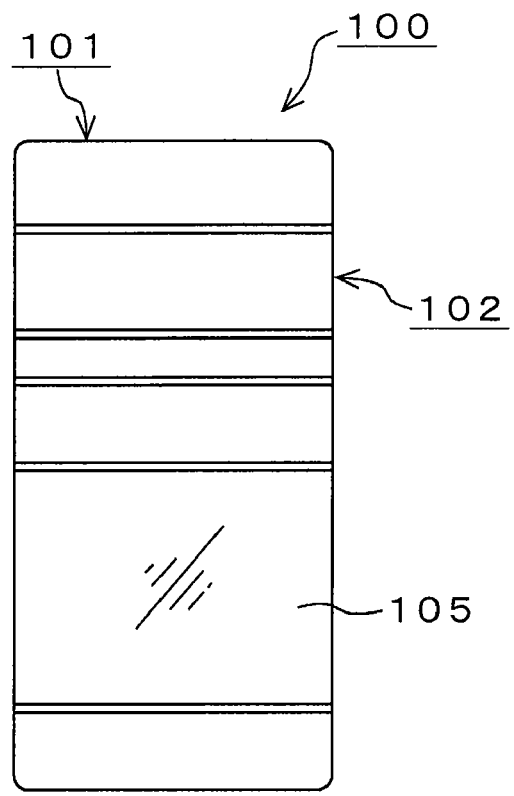
FIGS. 4A and 4B are illustrations for showing a front view and a rear view, respectively, of the personal computer shown in FIG. 3.
Figure 4B:
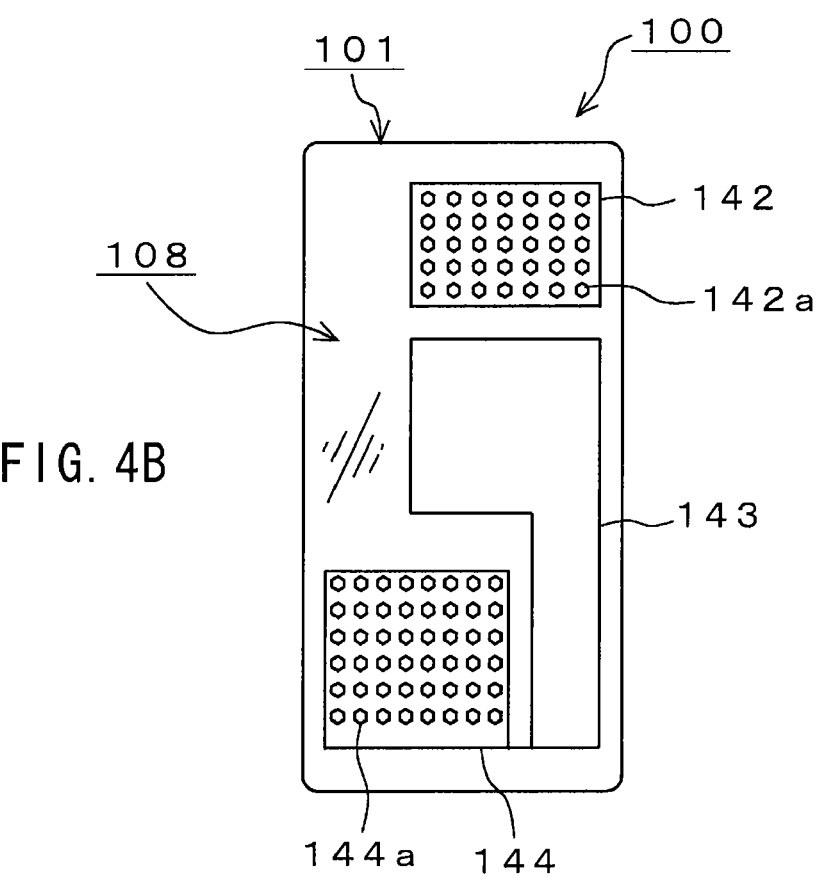

FIGS. 4A and 4B are illustrations for showing a front view and a rear view, respectively, of the computer 100. The front panel 102 of the housing 101 shown in FIG. 4A has the detachable member 105 for use in a case of, for example, any exchange of the hard disk drives. The rear panel 108 of the housing 101 shown in FIG. 4B includes a first vent 142, a second vent 144, and connection terminals 143 for peripherals. The first vent 142 is formed of many hexagonal openings 142a. The second vent 144 is also formed of many hexagonal openings 144a. The first and second vents 142, 144 exhaust the outside air taken from the air intake opening 104 into the housing 101 toward outside. The connection terminals 143 for peripherals are used for connecting a mouse, a key board and the like thereto.

Figure 5A:
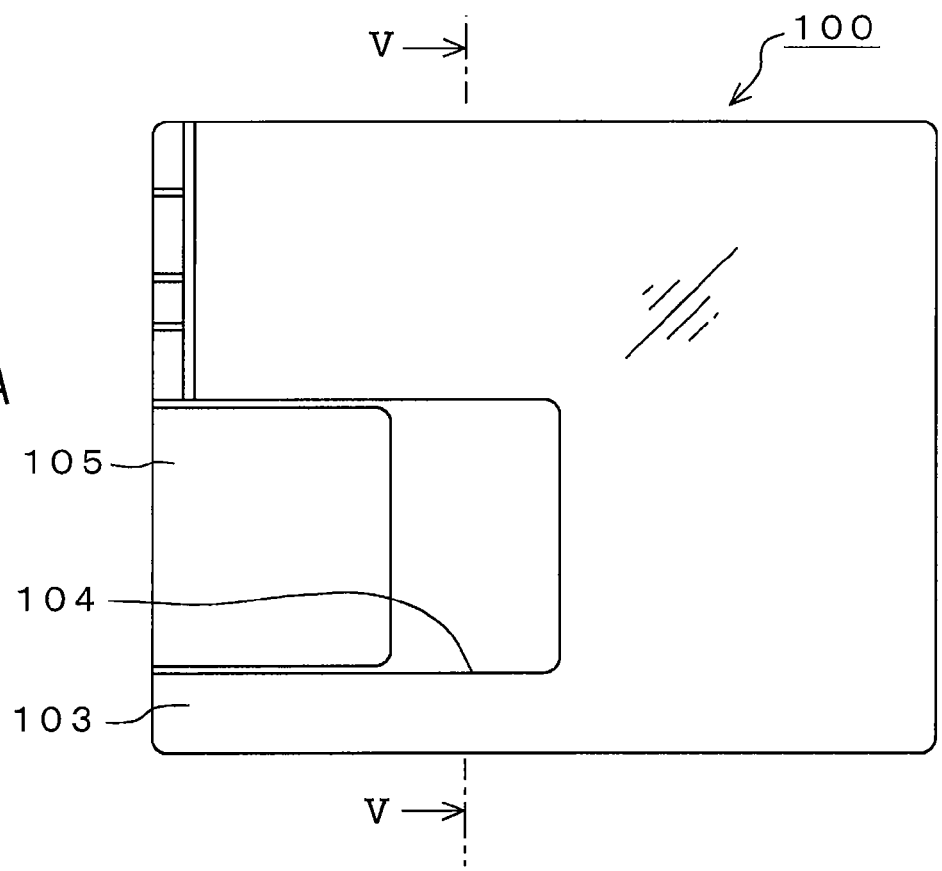
FIG. 5A is a diagram for showing a formed example of an air intake opening in the personal computer shown in FIG. 3.
Figure 5B:
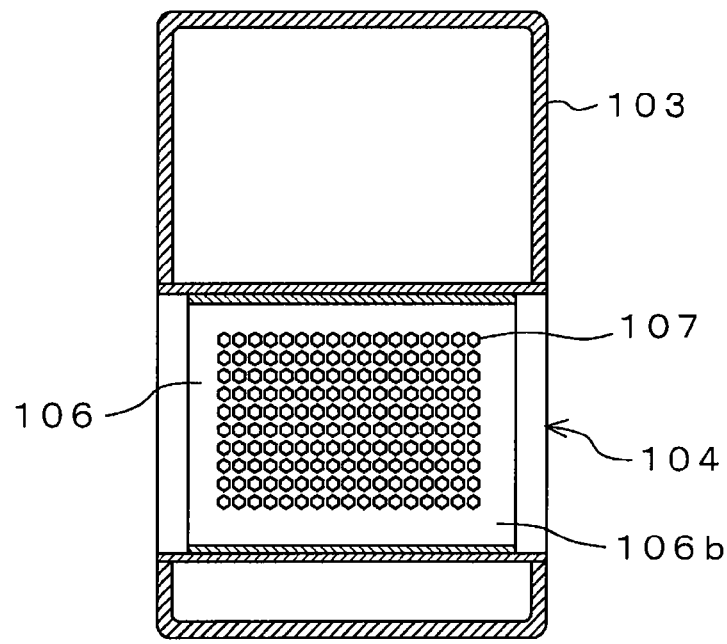
FIG. 5B is a vertically cross-sectional view of the personal computer taken along lines V-V shown in FIG. 5A.

FIG. 5A shows an arrangement example of an air intake opening 104 in the computer 100. The side panel 103, which is shown in FIG. 5A that is a side view of the housing 101 of the computer 100, has the air intake opening 104 for taking outside air thereinto and the passage for allowing the air to flow therein. FIG. 5B is a vertical by cross-sectional view of the computer 100 taken along lines V-V shown in FIG. 5A. As shown in FIG. 5B, the air intake member 106 is arranged in the passage. The air intake member 106 has the first and second opposite air intake portions 106a, 106b in which many hexagonal openings 107 are worn. Outside air is taken from the openings 107 into the housing 101. The first and second air intake portions 106a, 106b have relatively wide areas, so that an area in which openings 107 can be worn is made wider in the first and second air intake portions 106a, 106b that are respectively positioned facing the electronic parts.

Figure 6A:
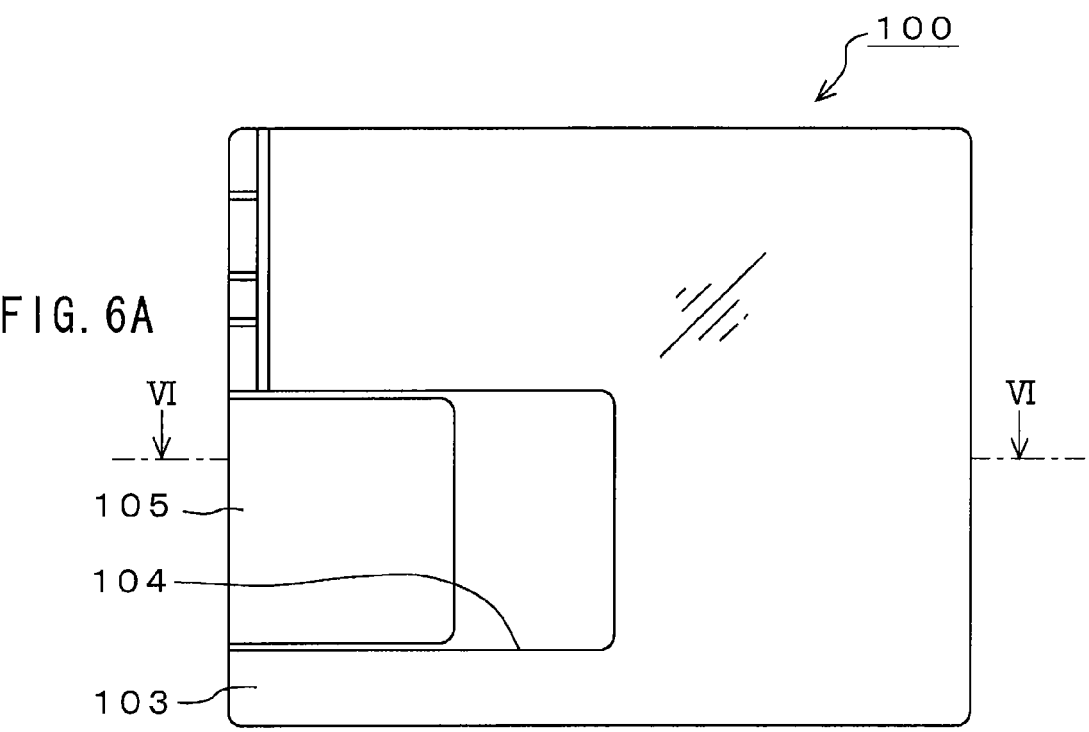
FIG. 6A is a diagram for showing a formed example of the air intake opening in the personal computer shown in FIG. 3.
Figure 6B:
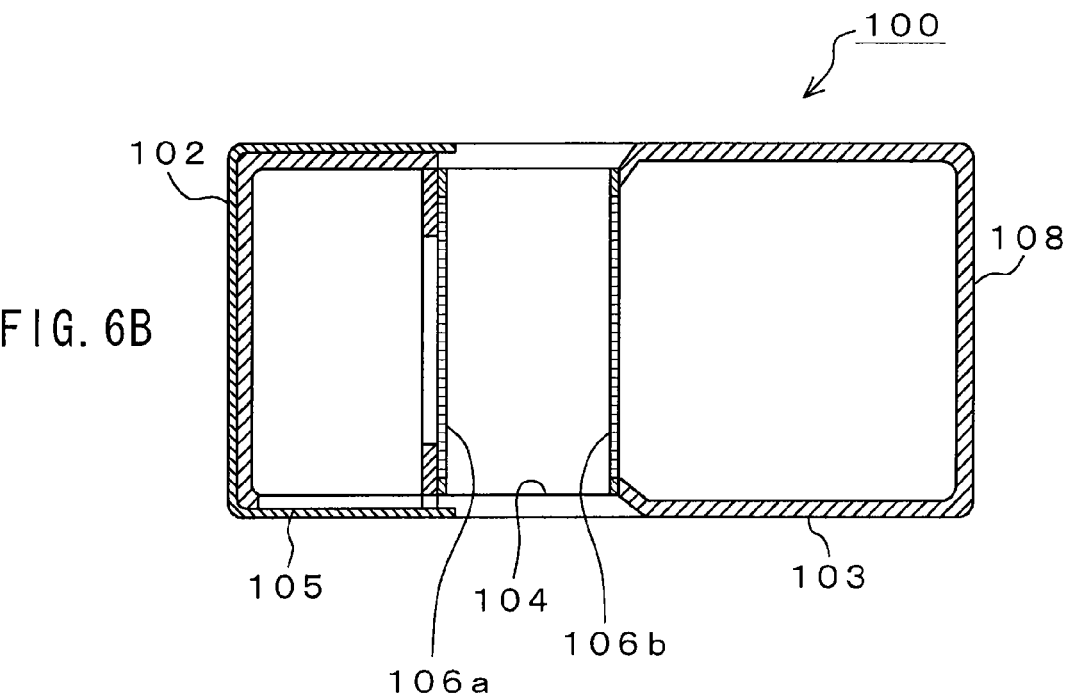
FIG. 6B is a horizontally cross-sectional view of the personal computer taken along lines VI-VI shown in FIG. 6A.

FIG. 6A is a diagram for showing a formed example of the air intake opening 104 in the computer 100. FIG. 6B is a horizontal by cross-sectional view of the computer 100 taken along lines VI-VI shown in FIG. 6A. As shown in FIG. 6B, the air intake member 106 is arranged in the passage of the housing 101 so that the first air intake portion 106a thereof having openings 107 for taking outside air into a part of the housing 101 can be positioned at a side of front panel 102 and the second air intake portion 106b having openings 107 for taking outside air into the other part of the housing 101 can be positioned at a side of the rear panel 108.

Figure 7:
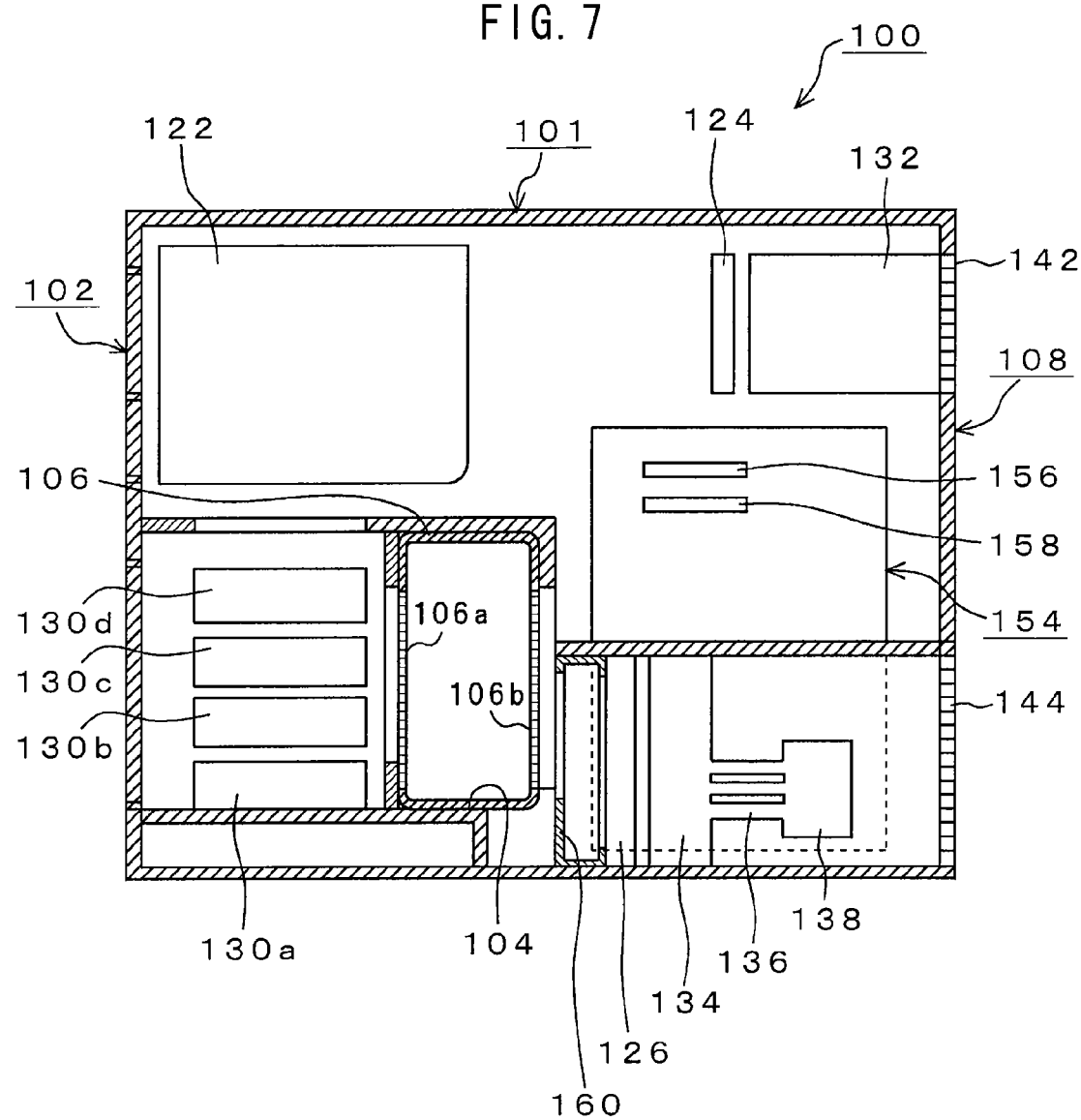
FIG. 7 is a cross-sectional view of the personal computer shown in FIG. 3 for showing an arrangement example of its electronic parts.

FIG. 7 is a cross-sectional view of the computer 100 for showing an arrangement example of its electronic parts. The computer 100 has a main board 154, CPU 138, a graphics card 156, a TV tuner card 158, hard disk drives 130a through 130d, an optical drive 122, a heat sink 134, heat pipes 136, a power unit 132, and first and second cooling fans 124, 126. It is to be noted that the first cooling fan 124 and the second cooling fan 126 are functioned as first and second exhausting devices, respectively.

The CPU 138, the heat sink 134, and the heat pipes 136 are provided near the second vent 144. Heat generated by the CPU 138 is transferred through the heat pipes 136 to the heat sink 134 that absorbs the heat. The second cooling fan 126 forces outside air that is taken from a lower portion of the second air intake portion 106b of the air intake member 106 through a duct 160 to circulate, thereby directly exposing to the air the heat sink 134 that has absorbed the heat generated by the CPU 138. This enables the air to which the heat sink 134 is exposed to absorb any heat from the heat sink 134. The second cooling fan 126 exhausts this heat-absorbed air through the second vent 144 toward outside. Thus, since the second air intake portion 106b of the air intake member 106 is positioned facing or adjacent to the heat sink 134, it is possible to expose the heat sink 134 to the outside air to an extensive area thereof. Therefore, the heat sink 134 can be efficiently cooled.

The first cooling fan 124 and the power unit 132 are provided near the first vent 142. The graphics card 156 and the TV tuner card 158 are provided near the power unit 132. The first cooling fan 124 forces outside air that is taken from a upper portion of the second air intake portion 106b of the air intake member 106, not through the duct 160, to circulate, thereby exposing to the air the graphics card 156 and the TV tuner card 158. This enables the air to which the graphics card 156 and the TV tuner card 158 are exposed to absorb any heat from the graphics card 156 and the TV tuner card 158. The first cooling fan 124 then forces the heat-absorbed air to circulate, thereby exposing to the heat-absorbed air the power unit 132. The first cooling fan 124 exhausts this further heat-absorbed air through the first vent 142 toward outside.

The first air intake portion 106a of the air intake member 106 is positioned near the hard disk drives 130a through 130d. The optical drive 122 is provided above the hard disk drives 130a through 130d. The first cooling fan 124 also forces outside air that is taken from the first air intake portion 106a of the air intake member 106 to circulate, thereby directly exposing to the air the hard disk drives 130a through 130d. This enables the air to which the hard disk drives 130a through 130d are exposed to absorb any heat from the hard disk drives 130a through 130d. The first cooling fan 124 further forces the heat-absorbed air to circulate between the hard disk drive 130d and the optical drive 122. The first cooling fan 124 then forces this circulated air to circulate, thereby exposing the power unit 132 to the circulated air to absorb any heat generated by the power unit 132. The first cooling fan 124 exhausts this further heat-absorbed air through the first vent 142 toward outside. Thus, since the first air intake portion 106a of the air intake member 106 is positioned facing or adjacent to the hard disk drives 130a through 130d, it is possible to expose the hard disk drives 130a through 130d to the outside air to an extensive area thereof. Therefore, the hard disk drives 130a through 130d can be efficiently cooled.

Figure 8:
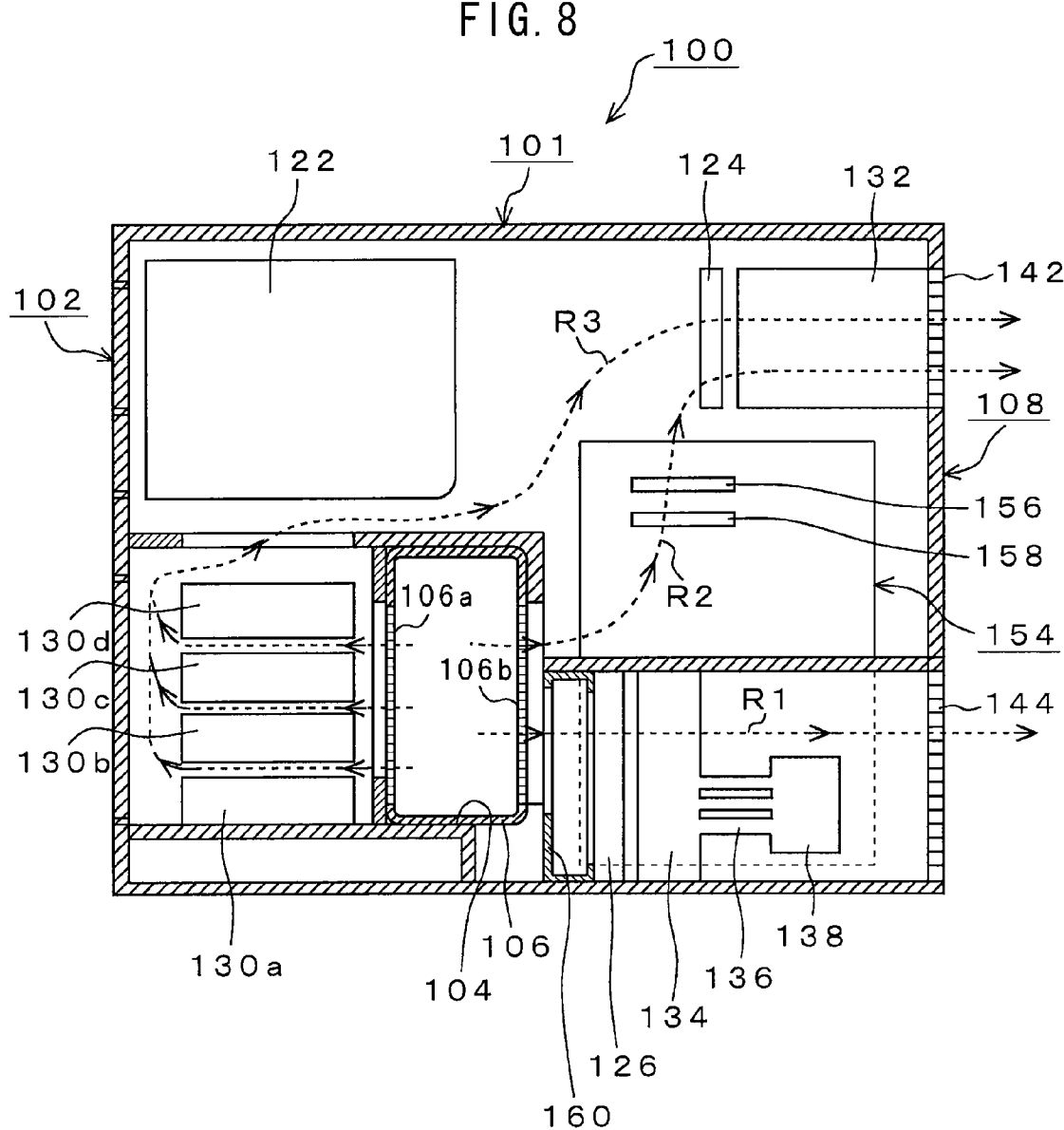
FIG. 8 is a cross-sectional view of the personal computer shown in FIG. 3 for showing an example of air intake.

FIG. 8 is a cross-sectional view of the computer 100 for showing an example of air intake. There are three ways R1, R2, and R3 to take outside air from the air intake opening 104 and exhaust the heated air, as shown in FIG. 7.

According to the first way R1, the outside air taken from the lower portion of the second air intake portion 106b of the air intake member 106 absorbs the heat from the heat sink 134 and this heat-absorbed air is exhausted toward outside through the second vent 144. In other words, in this first way R1, the second cooling fan 126 forces outside air that is taken from the lower portion of the second air intake portion 106b of the air intake member 106 through the duct 160 to circulate, thereby directly exposing to the air the heat sink 134 that has absorbed the heat generated by the CPU 138. This air absorbs any heat from the heat sink 134. The second cooling fan 126 exhausts this heat-absorbed air through the second vent 144 toward outside.

According to the second way R2, the outside air taken from the upper portion of the second air intake portion 106b of the air intake member 106 absorbs the heat from the graphics card 156 and the TV tuner card 158 and this heat-absorbed air is exhausted toward outside through the first vent 142. In other words, in this second way R2, the first cooling fan 124 forces outside air that is taken from a upper portion of the second air intake portion 106b of the air intake member 106, not through the duct 160, to circulate, thereby exposing to the air the graphics card 156 and the TV tuner card 158. This air absorbs any heat from the graphics card 156 and the TV tuner card 158. The first cooling fan 124 then forces the heat-absorbed air to circulate, thereby exposing to the heat-absorbed air the power unit 132. The first cooling fan 124 further exhausts this further heat-absorbed air toward outside through the first vent 142.

According to the third way R3, the outside air taken from the first air intake portion 106a of the air intake member 106 absorbs the heat from the hard disk drives 130a through 130d and the optical drive 122 and this heat-absorbed air is exhausted toward outside through the first vent 142. In other words, in this third way R3, the first cooling fan 124 forces outside air that is taken from the first air intake portion 106a of the air intake member 106 to circulate, thereby directly exposing to the air the hard disk drives 130a through 130d. This air absorbs any heat from the hard disk drives 130a through 130d and the like and is circulated between the hard disk drive 130d and the optical drive 122. The first cooling fan 124 then forces this circulated air to circulate, thereby exposing the power unit 132 to the circulated air to absorb any heat generated by the power unit 132. The first cooling fan 124 further exhausts this further heat-absorbed air toward outside through the first vent 142.

Thus, by the three ways to take outside air from the air intake opening 104 and exhaust the heated air, it is possible to expose the heat sink 134 and the hard disk drives 130a through 130d, respectively, to the outside air to an extensive area thereof. Therefore, the heat sink 134 and the hard disk drives 130a through 130d can be efficiently cooled. This prevents the CPU 138 and the hard disk drives 130a through 130d from raising a temperature thereof, so that the computer 100 can avoid throughput thereof from dropping under a condition where raising a temperature thereof.

According to the computer 100 as an embodiment of the invention, the first air intake portion 106a of the air intake member 106 is positioned facing or adjacent to the hard disk drives 130a through 130d and the second air intake portion 106b of the air intake member 106 is positioned facing or adjacent to the heat sink 134.

Since the first cooling fan 124 forces outside air that is taken from the first air intake portion 106a of the air intake member 106 to circulate, thereby directly exposing to the air the hard disk drives 130a through 130d, and exhausts this air to which the hard disk drives 130a through 130d are exposed toward outside, it is possible to delete a special-purpose cooling fan for cooling the hard disk drives 130a through 130d.

Although it has been described in the above embodiments of the invention that the side panels 103 have air intake openings 104, this invention is not limited thereto. Only one side panel 103 can have the air intake opening 104.

It should be understood by those skilled in the art that various modifications, combinations, sub-combinations and alternations may occur depending on design requirements and other factors insofar as they are within the scope of the appended claims or the equivalents thereof.

What is claimed is:

1. An information-processing apparatus comprising:
    a housing enclosing at least first and second portions with at least two electronic parts to be cooled, said housing having a passage therethrough, said passage having a first opening in fluid communication with said first portion and a second opening in fluid communication with said second portion;
    an air intake member having two air intake portions for separating air flowing in the passage into first and second oppositely flowing air portions, said air intake member being arranged positioned within the passage, said first and second air intake portions are positioned on opposite surfaces of said air intake member, said first air intake portion being in fluid communication with said first opening and said second air intake portion being in fluid communication with said second opening;
    a first exhausting device that exposes a thermal part within the first portion to air separated by the air intake member; and
    a second exhausting device that exposes one of the electronic parts within the second portion to air separated by the air intake member,
    wherein,
    said second exhausting device exposes a magnetic storage device to said second portion of the air separated in the air intake member; and
    at least one of said first and second air intake portions of the air intake member is positioned facing a central processing unit.

2. The information-processing apparatus according to claim 1, wherein said at least one of said first and second air intake portions of the air intake member is positioned adjacent to a predetermined surface to be cooled of the electronic part.

3. The information-processing apparatus according to claim 1, wherein:
    said housing encloses the central processing unit, a magnetic storage device, and a third electronic device;
    said first exhausting device exposes the central processing unit to said first air portion of the air separated by said air intake member and exhausting the first air portion of the air to outside; and
    said second exhausting device exhausts the second air portion of the air to outside and exposes the third electronic device to a third air portion of the air separated in the air intake member and exhausts the third air portion of the air to outside.

4. A cooling system for cooling an electronic part, which is suitable for use in an information-processing apparatus, said cooling system comprising:
    a housing enclosing at least two electronic parts to be cooled and having at least one opening and a passage through the housing and in fluid communication with the opening, said passage allowing air to flow therein;
    an air intake member having two air intake portions for separating the air flown in the passage into first and second oppositely flowing air portions, said air intake member being arranged in the passage, said first and second air intake portions, said first and said second air intake portions being positioned opposite sides of said air intake member;
    a first exhausting device that exposes a thermal part to the first portion of the air separated in the air intake member and exhausts the first portion of the air to outside; and
    a second exhausting device that exposes one of the electronic parts to the second portion of the air separated in the air intake member and exhausts the second portion of the air to outside, wherein, said second exhausting device exposes a magnetic storage device to said second portion of the air separated in the air intake member; and at least one of said first and second air intake portions of the air intake member is positioned facing a central processing unit.

5. The cooling system according to claim 4, wherein at least one of said first and second air intake portions of the air intake member is positioned adjacent to a predetermined surface to be cooled of the electronic part.

6. The cooling system according to claim 4, wherein, the housing encloses the central processing unit, a magnetic storage device, and a third electronic device;

the first exhausting device exposes the central processing unit to the first portion of the air separated in the air intake member and exhausts the first portion of the air to outside; and the second exhausting device exhausts the second portion of the air to outside and exposes the third electronic device to a third portion of the air separated in the air intake member and exhausts the third portion of the air to outside.

7. An information-processing apparatus comprising:

a housing enclosing at least first and second portions with at least two electronic parts to be cooled, said housing having a passage therethrough, said passage having a first opening in fluid communication with said first portion and a second opening in fluid communication with said second portion;

an air intake member having two air intake portions for separating air flowing in the passage into first and second oppositely flowing air portions, said air intake member being arranged positioned within the passage, said first and second air intake portions are positioned on opposite surfaces of said air intake member, said first air intake portion being in fluid communication with said first opening and said second air intake portion being in fluid communication with said second opening;

a first exhausting device that exposes a thermal part within the first portion to air separated by the air intake member; and a second exhausting device that exposes one of the electronic parts within the second portion to air separated by the air intake member, wherein, at least one of said first and second air intake portions of the air intake member is positioned facing one of the electronic parts within the first or the second portion of said housing;

said housing encloses a central processing unit, a magnetic storage device, and a third electronic device;

said first exhausting device exposes the central processing unit to said first air portion of the air separated by said air intake member and exhausting the first air portion of the air to outside;

said second exhausting device exhausts the second air portion of the air to outside and exposes the third electronic device to a third air portion of the air separated in the air intake member and exhausts the third air portion of the air to outside; and at least one of said first and second air intake portions of the air intake member is positioned facing any one of the central processing unit and the magnetic storage device.

8. A cooling system to cool an electronic part, which is suitable for use in an information-processing apparatus, said cooling system comprising:

a housing enclosing at least two electronic parts to be cooled and having at least one opening and a passage through the housing and in fluid communication with the opening, said passage allowing air to flow therein;

an air intake member having two air intake portions to separate the air flown in the passage into first and second oppositely flowing air portions, said air intake member being arranged in the passage, said first and second air intake portions, said first and said second air intake portions being positioned opposite sides of said air intake member;

a first exhausting device to expose a thermal part to the first portion of the air separated in the air intake member and exhaust the first portion of the air to outside; and a second exhausting device to expose one of the electronic parts to the second portion of the air separated in the air intake member and exhaust the second portion of the air to outside, wherein, at least one air intake portion of the air intake member is positioned facing the electronic part;

the housing encloses a central processing unit, a magnetic storage device, and a third electronic device;

the first exhausting device exposes the central processing unit to the first portion of the air separated in the air intake member and exhausting the first portion of the air to outside;

the second exhausting device exposes the magnetic storage device to the second portion of the air separated in the air intake member and exhausts the second portion of the air to outside and exposes the third electronic device to a third portion of the air separated in the air intake member and exhausts the third portion of the air to outside; and at least one air intake portion of the air intake member is positioned facing any one of the central processing unit and the magnetic storage device.

* * * * *